(12) United States Patent
Wong et al.

(10) Patent No.: US 12,024,457 B2
(45) Date of Patent: Jul. 2, 2024

(54) FLEXIBLE GLASS AND MANUFACTURING METHOD THEREOF

(71) Applicant: CHENFENG OPTRONICS CORPORATION, Taichung (TW)

(72) Inventors: Ching-Fang Wong, Taichung (TW); Yu-Wei Liu, Taichung (TW); Wei-Lun Zeng, Taichung (TW); Kuan-Hua Liao, Taichung (TW)

(73) Assignee: CHENFENG OPTRONICS CORPORATION, Taichung (TW)

( * ) Notice: Subject to any disclaimer, the term of this patent is extended or adjusted under 35 U.S.C. 154(b) by 0 days.

(21) Appl. No.: 17/957,664

(22) Filed: Sep. 30, 2022

(65) Prior Publication Data

US 2024/0109803 A1 Apr. 4, 2024

(51) Int. Cl.
| | |
|---|---|
| *C03B 23/023* | (2006.01) |
| *B32B 1/00* | (2006.01) |
| *B32B 3/14* | (2006.01) |
| *B32B 17/06* | (2006.01) |

(52) U.S. Cl.
CPC ............ *C03B 23/0235* (2013.01); *B32B 1/00* (2013.01); *B32B 3/14* (2013.01); *B32B 17/06* (2013.01); *B32B 2250/02* (2013.01); *B32B 2255/26* (2013.01); *B32B 2307/546* (2013.01); *B32B 2307/732* (2013.01); *B32B 2315/08* (2013.01); *B32B 2457/20* (2013.01)

(58) Field of Classification Search
CPC .................................................... C03B 23/023
USPC ......................................................... 428/161
See application file for complete search history.

(56) References Cited

U.S. PATENT DOCUMENTS

2020/0199020 A1* 6/2020 Hatano ................. G06F 1/1626
2022/0081352 A1* 3/2022 Wong ...................... C03C 17/32

FOREIGN PATENT DOCUMENTS

CN 113451535 A * 9/2021

OTHER PUBLICATIONS

Machine_english_translation_CN_113451535_A; Bi Tiejun, et. al.; Display panel, transparent cover plate and manufacturing method thereof; Sep. 28, 2021; EPO; whole document (Year: 2023).*

* cited by examiner

*Primary Examiner* — Tahseen Khan
(74) *Attorney, Agent, or Firm* — Birch, Stewart, Kolasch & Birch, LLP

(57) ABSTRACT

The present invention provides a flexible glass and manufacturing method thereof. The flexible glass includes a first straight part and a second straight part on two opposite ends thereof, a recess formed between the first straight part and the second straight part, and a pre-bent curve connection part disposed corresponding to the recess. The first straight part and the second straight part are not arranged on the same plane. The flexible glass has a first lateral side and a second lateral side, and the recess sinks from the first lateral side toward the second lateral side. Therefore, the flexible glass is provided with a greater bendability.

12 Claims, 6 Drawing Sheets

FLEXIBLE GLASS AND MANUFACTURING METHOD THEREOF

BACKGROUND OF THE INVENTION

1. Field of the Invention

The present invention relates to glasses, and more particularly, to a flexible glass and manufacturing method thereof.

2. Description of the Related Art

Glass is used in a variety of applications, such as the usage in portable electronic devices, in-vehicle electronic display devices, or glass protectors for screens.

A bendable or foldable screen provides higher and greater visual experience for viewers. Therefore, electronic products with a bendable or foldable screen are gradually accepted by consumers, such that the demand for bendable or foldable glasses is accordingly increased.

A thinner glass has a higher bendability or foldability; however, the thinner glass is easier to break as well. Also, the thinner glass suffers from the issue of insufficient strength. Therefore, it is desirable to resolve such issues by the present invention.

SUMMARY OF THE INVENTION

To improve the issues above, the present invention discloses a flexible glass and manufacturing method thereof. The glass substrate comprises a recess and a pre-bent curve connection part arranged corresponding to the position of the recess, whereby the glass accordingly manufactured has a preferable bendability.

For achieving the aforementioned objectives, the present invention provides a flexible glass in accordance with an embodiment of the present invention, comprising:

a first straight part and a second straight part on two opposite ends thereof, a recess formed between the first straight part and the second straight part, and a pre-bent curve connection part disposed corresponding to the recess, the first straight part and the second straight part not being arranged on a same plane; the flexible glass comprising a first lateral side and a second lateral side, the recess sinking from the first lateral side toward the second lateral side; the flexible glass further comprising a strengthened layer filled in the recess; the strengthened layer comprising a phenyl polymer or epoxy resin, the phenyl polymer having a monomer carbon chain length of C6 to C18; wherein a width of the curve connection part is smaller than a width of the recess, the width of the recess ranges from 30 mm to 70 mm, and the width of the curve connection part ranges from 20 mm to 60 mm.

For achieving the aforementioned objectives, the present invention also provides a method of manufacturing flexible glass in accordance with an embodiment of the present invention, comprising following steps:

providing a glass substrate comprising a first straight part, a second straight part, a first lateral side, and a second lateral side;

forming a recess on the glass substrate from the first lateral side toward the second lateral side; and heating the recess to bend the recess into a curve connection part, whereby the first straight part and the second straight part are not arranged on a same plane, and forming a strengthened layer on the first lateral side after the curve connection part is formed, the strengthened layer being filled into the recess, the strengthened layer comprising a phenyl polymer or epoxy resin, the phenyl polymer having a monomer carbon chain length of C6 to C18; wherein a width of the curve connection part is smaller than a width of the recess, the width of the recess ranges from 30 mm to 70 mm, and the width of the curve connection part ranges from 20 mm to 60 mm.

With such configuration, the glass substrate of the present invention comprises a pre-bent curve connection part corresponding to the recess to improve the bendability of the glass substrate. Preferably, the bendability of the glass substrate is improved by 20 degrees to 40 degrees, to as fulfill the requirement of different displaying screens.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion. Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Figure 1:
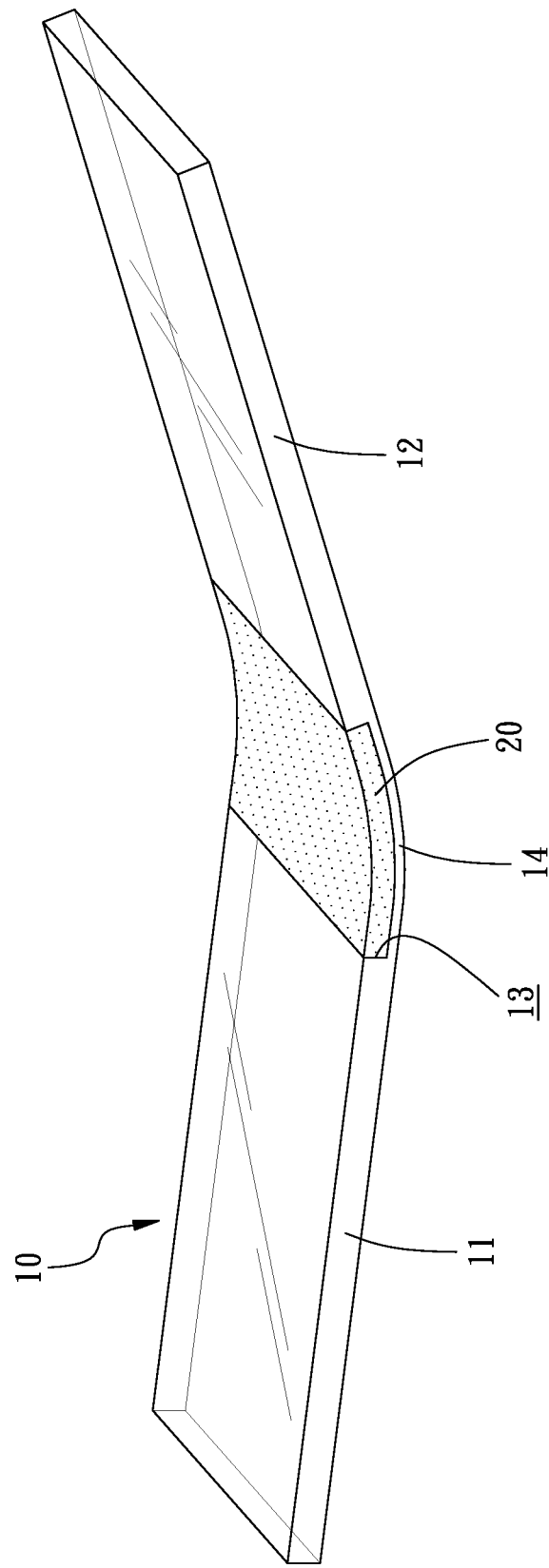
FIG. 1 is a perspective view of the flexible glass in accordance with the first embodiment of the present invention.
Figure 2:
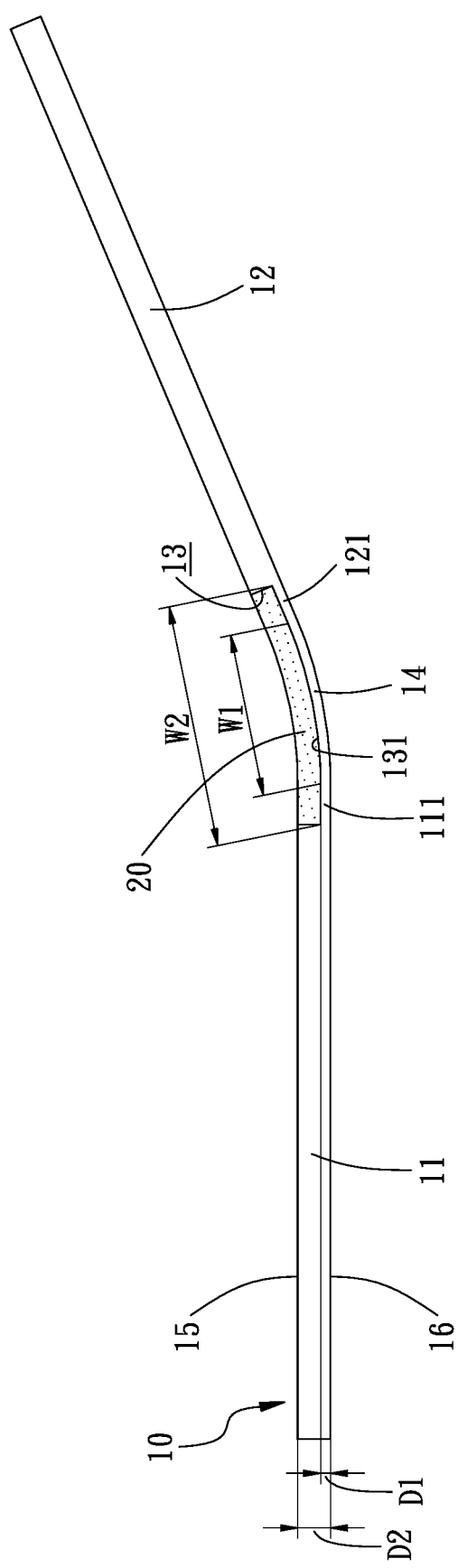
FIG. 2 is a side view of the flexible glass in accordance with the first embodiment of the present invention.

Referring to FIG. 1 to FIG. 2, the present invention provides a flexible glass 100. The flexible glass 100 comprises a glass substrate 10, having a first straight part 11 and a second straight part 12 on two opposite ends thereof. A recess 13 is formed between the first straight part 11 and the second straight part 12, with a curve connection part 14 disposed corresponding to the recess 13. The curve connection part 14 is allowed to be pre-bent, such that the first straight part 11 and the second straight part 12 are permanently not arranged on the same plane. In the embodiment, the radius of curvature of the curve connection part 14 ranges from 10 mm to 300 mm. In the embodiment, the recess 13 is formed in a rectangular shape.

The glass substrate 10 comprises a first lateral side 15 and a second lateral side 16. The recess 13 sinks from the first lateral side 15 toward the second lateral side 16. The recess 13 comprises a recess bottom 131. The depth D1 of the recess bottom 131 extending toward the second lateral side 16 ranges from 0.03 mm to 0.6 mm. In other words, the depth of the glass at the position of the recess 13 ranges from 0.03 mm to 0.6 mm. Therein, the depth D1 is also the depth of the curve connection part 14. According to experiment, when the depth D1 is less than 0.03 mm, the depth of the glass at the position of the recess 13 is considered as having insufficient strength, and it will be easily broken in the Four Point Bending Test. When the depth of the glass at the position of the recess 13 is larger than 0.6 mm, the glass is difficult to be flexible and bendable. Therefore, in the embodiment, for the glass to have both strength and flexibility, the depth D1 preferably ranges from 0.05 mm to 0.4 mm, and the depth D2 from the first lateral side 15 to the second lateral side 16 preferably ranges from 1 mm to 4 mm.

The first straight part 11 comprises a first connection section 111 corresponding to the recess 13 and connected to one end of the curve connection part 14. The second straight part 12 comprises a second connection section 121 corresponding to the recess 13 and connected to another end of the curve connection part 14. The width W1 of the curve connection part 14 is smaller than the width W2 of the recess 13. The width W1 of the curve connection part 14 ranges from 20 mm to 60 mm. Therein, the flexible glass 100 is bent toward the recess 13, that is, the first straight part 11 and the second straight part 12 are bent toward the recess 13. The width W2 ranges from 30 mm to 70 mm.

In another embodiment of the present invention, the glass substrate 10 further comprises a strengthened layer 20, which is partially or completely filled into the recess 13. Alternatively in other embodiments, the strengthened layer 20 is allowed to be disposed on the whole or a part of the first lateral side 15. The strengthened layer 20 comprises a phenyl polymer, epoxy resin, or printing ink. If the printing ink is selected, the printing ink corresponds to the black matrix (BM) area of the glass for sheltering the electronic circuit. The phenyl polymer has a monomer carbon chain length of C6 to C18, which is capable of improving the anti-collision effect of the glass substrate 10. The epoxy resin improves the toughness of the strengthened layer 20 and the adherence of the glass substrate 10, such that the glass substrate 10 is prevented from rupture due to the concentration of prestress on the recess 13 and the curve connection part 14, whereby the strengthened layer 20 improves the strength of the recess 13 and the curve connection part 14. In other embodiments, the strengthened layer 20 is allowed to be transparent.

Therefore, the recess 13 of the flexible glass 100 in accordance with the present invention improves the bendability of the overall glass. Also, the pre-bent curve connection part 14 increases the bending angle of the glass by 20 to 40 degrees, so as to improve the bending curvature to fulfill demands of various products.

Figure 3:
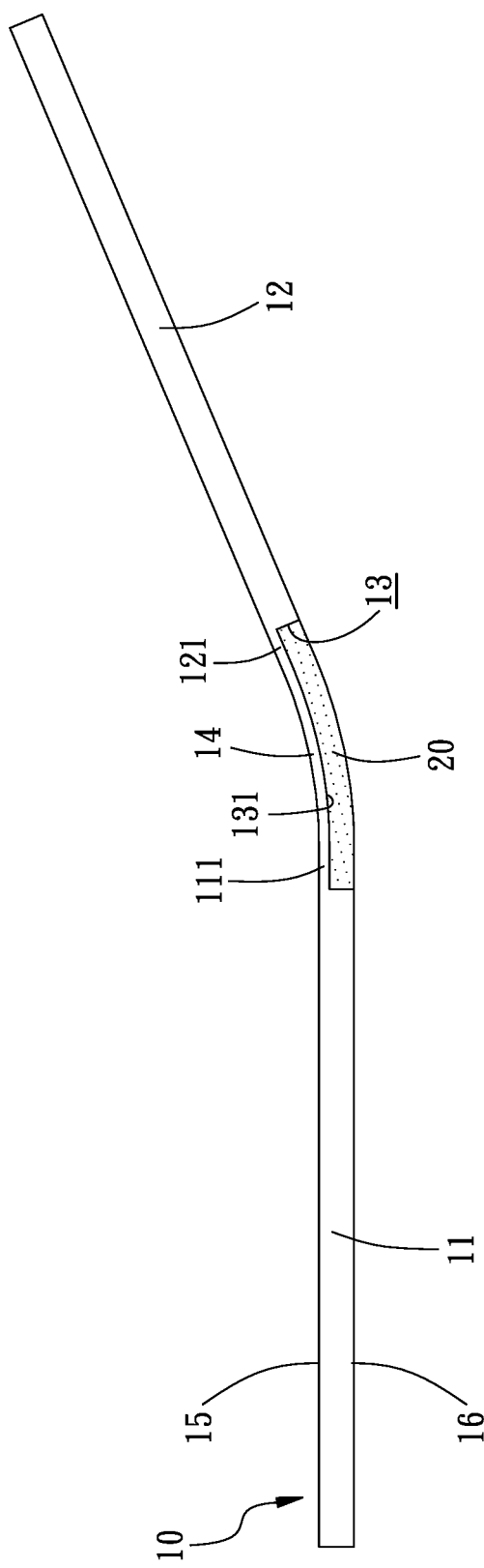
FIG. 3 is a side view of the flexible glass in accordance with the second embodiment of the present invention.

Referring to FIG. 3, the flexible glass 100 in accordance with the second embodiment of the present invention is illustrated, wherein the identical reference numbers in the drawings represent identical components, structure, or corresponding function in the first embodiment of the present invention, such that the descriptions of identical components are saved. Therein, the flexible glass 100 is bent toward the direction away from the recess 13, that is, the first straight part 11 and the second straight part 12 are bent toward the direction away from the recess 13.

Figure 4:
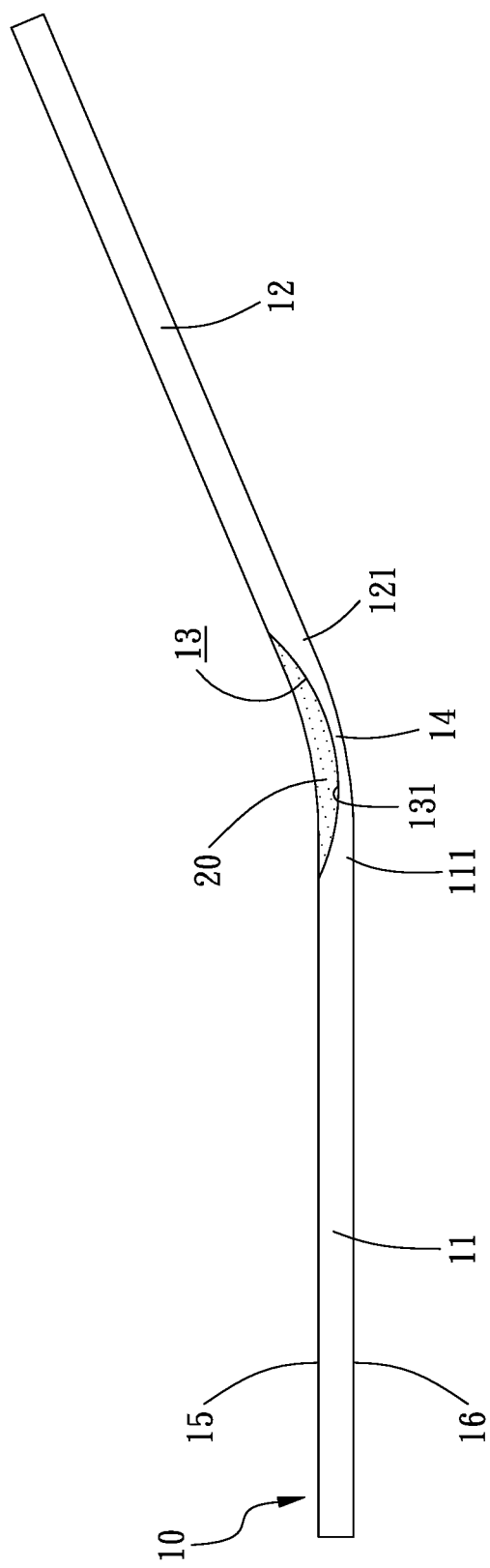
FIG. 4 is a side view of the flexible glass in accordance with the third embodiment of the present invention.

Referring to FIG. 4, the flexible glass 100 in accordance with the third embodiment of the present invention is illustrated, wherein the identical reference numbers in the drawings represent identical components, structure, or corresponding function in the first embodiment of the present invention, such that the descriptions of identical components are saved. Therein, the recess 13 is formed in an arc shape.

Figure 5:
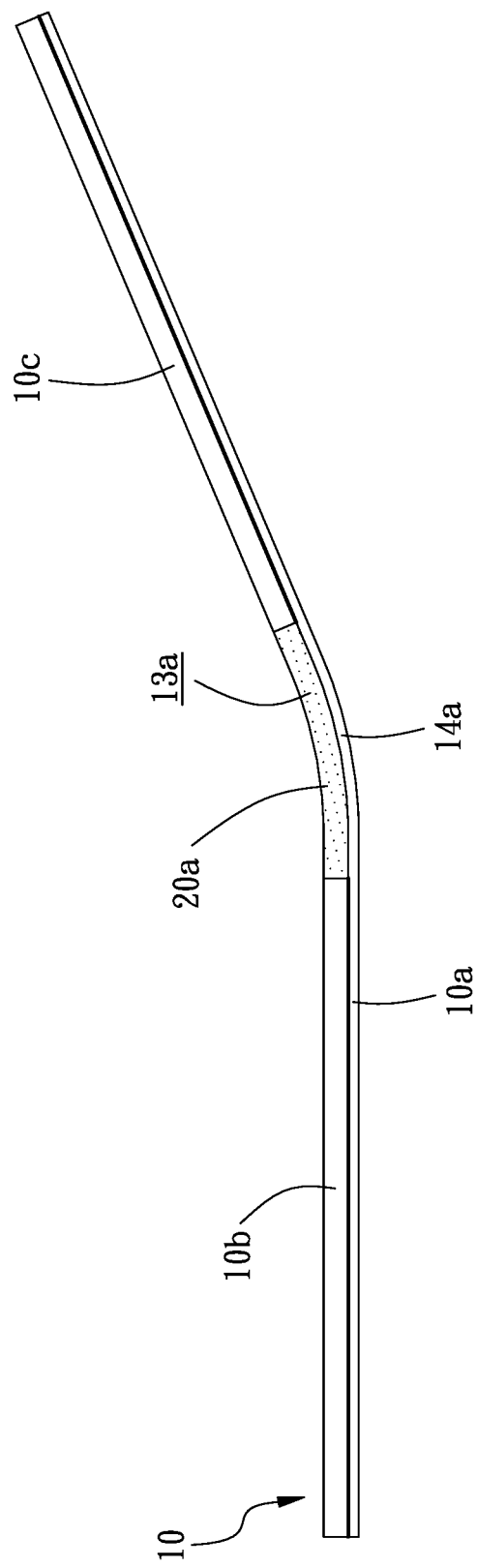
FIG. 5 is a side view of the flexible glass in accordance with the fourth embodiment of the present invention.

Referring to FIG. 5, the flexible glass 100 in accordance with the fourth embodiment of the present invention is illustrated, wherein the identical reference numbers in the drawings represent identical components, structure, or corresponding function in the first embodiment of the present invention, such that the descriptions of identical components are saved. Therein, the glass substrate 10 comprises a bottom glass 10a, a first adhering glass 10b, and a second adhering glass 10c. The first adhering glass 10b and the second adhering glass 10c are disposed on two opposite sides on the same lateral side of the bottom glass 10a, respectively. The curve connection part 14a is disposed on the bottom glass 10a. The recess 13a is formed of the enclosure of the bottom glass 10a, the first adhering glass 10b, and the second adhering glass 10c. The recess 13a also comprises a strengthened layer 20a, so as to achieve the same functions of the aforementioned embodiments.

Figure 6:
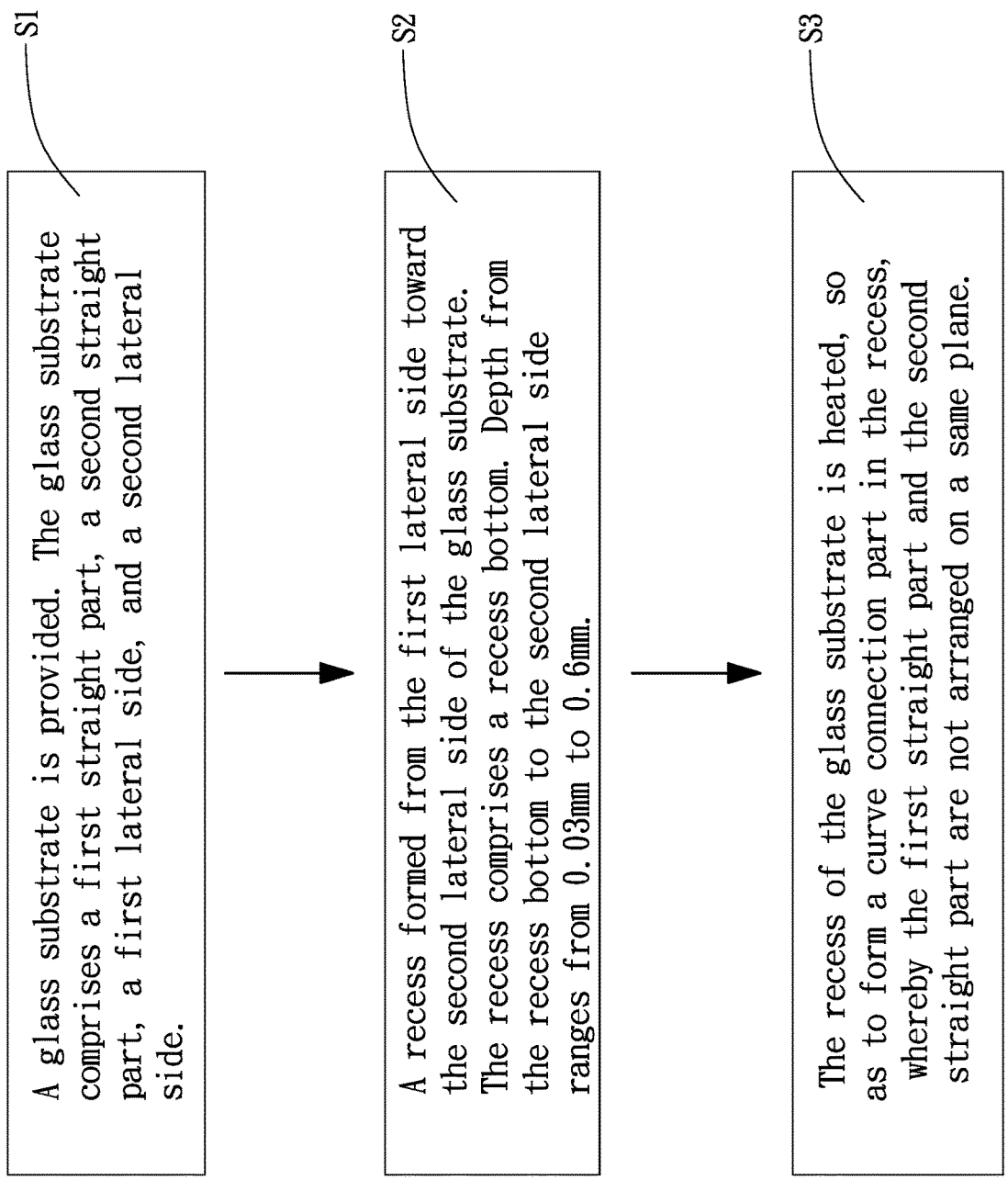
FIG. 6 is a flow chart of the manufacturing method of the flexible glass in accordance with the present invention.

Referring to FIG. 6 in view of FIG. 2, the method of manufacturing the flexible glass 100 in accordance with the first embodiment is illustrated, comprising following steps.

In step S1, a glass substrate 10 is provided, wherein the glass substrate 10 comprises a first straight part 11, a second straight part 12, a first lateral side 15, and a second lateral side 16. Therein, the depth D2 from the first lateral side 15 to the second lateral side 16 ranges from 1 mm to 4 mm.

In step S2, a recess 13 is formed on the glass substrate 10 from the first lateral side 15 toward the second lateral side 16 in a manner of etching or polishing. Also, the recess 13 is allowed to be formed in an arc shape of a rectangular shape. The depth D1 from the recess bottom 131 of the recess 13 to the second lateral side 16 ranges from 0.03 mm to 0.6 mm, and preferably from 0.05 mm to 0.4 mm.

In another embodiment of the present invention, after the recess 13 is formed, the glass substrate 10 undergoes a chemical strengthening process. For example, the glass substrate 10 is immersed in a potassium nitrate solution for performing chemical ion exchange, whereby the surface strength of the glass substrate 10 is improved.

In step S3, the position of the recess 13 of the glass substrate 10 is heated, so as to bend the position corresponding to the recess 13 for forming the curve connection part 14, whereby the first straight part 11 and the second straight part 12 are not arranged on a same plane. Therein, the first straight part 11 is connected to one end of the curve connection part 14 through a first connection section 111, and the second straight part 12 is connected to another end of the curve connection part 14 through a second connection section 121. The radius of curvature of the curve connection part 14 ranges from 10 mm to 300 mm. Also, the width W1 of the curve connection part 14 is smaller than the width W2 of the recess 13, and the width W1 ranges from 20 mm to 60 mm.

In another embodiment of the present invention, after step S3, a strengthened layer 20 is formed on the first lateral side 15, wherein the strengthened layer 20 is partially filled into the recess 13. Therein, the strengthened layer 20 comprises a phenyl polymer, epoxy resin, or printing ink. If the printing ink is selected, the printing ink corresponds to the black matrix (BM) area of the glass for sheltering the electronic circuit. The phenyl polymer has a monomer carbon chain length of C6 to C18.

In another embodiment of the present invention, other than the etching or polishing manner, the recess 13 is allowed to be formed through a glass stacking manner, such as the structure illustrated in the fourth embodiment of the present invention.

Therefore, the aforementioned method is applied for manufacturing the flexible glass 100 of the present invention to fulfill the customer demands.

With the foregoing configuration, the present invention achieves following advantages.

The glass substrate 10 comprises a curve connection part 14 which is pre-heated to form corresponding to the position of the recess 13, so as to improve the bendability of the glass substrate 10 and increase the bendability thereof by 20 to 40 degrees.

The width D1 of the glass substrate 10 corresponding to the position of the recess 13 ranges from 0.03 mm to 0.6 mm. Therefore, the glass substrate 10 has not only flexibility and bendability, but also a certain degree of structural strength.

The strengthened layer 20 is filled into the recess 13 of the glass substrate 10 to improve the combination strength of the recess 13, thereby increasing the overall structural strength of the glass and prevent it from rupture.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A flexible glass, comprising:
   a first straight part and a second straight part on two opposite ends thereof, a recess formed between the first straight part and the second straight part, and a pre-bent curve connection part disposed corresponding to the recess, the first straight part and the second straight part permanently not being arranged on a same plane; the flexible glass comprising a first lateral side and a second lateral side, the recess sinking from the first lateral side toward the second lateral side; the flexible glass further comprising a strengthened layer filled in the recess; the strengthened layer comprising a phenyl polymer or epoxy resin, the phenyl polymer having a monomer carbon chain length of C6 to C18; wherein a width of the curve connection part is smaller than a width of the recess, the width of the recess ranges from 30 mm to 70 mm, and the width of the curve connection part ranges from 20 mm to 60 mm.

2. The flexible glass of claim 1, further comprising a bottom glass, a first adhering glass, and a second adhering glass, the first adhering glass and a second adhering glass being disposed on two opposite sides of the bottom glass, the curve connection part being disposed on the bottom glass, the recess being formed of an enclosure of the bottom glass, the first adhering glass, and the second adhering glass.

3. The flexible glass of claim 1, wherein the recess comprises a recess bottom, and a depth from the recess bottom to the second lateral side ranges from 0.03 mm to 0.6 mm; the first straight part comprises a first connection section corresponding to the recess and connected to one end of the curve connection part; the second straight part comprises a second connection section corresponding to the recess and connected to another end of the curve connection part.

4. The flexible glass of claim 3, wherein a radius of curvature of the curve connection part ranges from 10 mm to 300 mm; a depth from the first lateral side to the second lateral side ranges from 1 mm to 4 mm; the depth from the recess bottom to the second lateral side ranges from 0.05 mm to 0.4 mm.

5. The flexible glass of claim 4, wherein the curve connection part is pre-bent; the recess is formed in an arc or a rectangular shape.

6. The flexible glass of claim 4, further comprising a bottom glass, a first adhering glass, and a second adhering glass, the first adhering glass and a second adhering glass being disposed on two opposite sides of the bottom glass, the curve connection part being disposed on the bottom glass, the recess being formed of an enclosure of the bottom glass, the first adhering glass, and the second adhering glass.

7. A method of manufacturing a flexible glass, comprising following steps:
   providing a glass substrate comprising a first straight part, a second straight part, a first lateral side, and a second lateral side;
   forming a recess on the glass substrate from the first lateral side toward the second lateral side; and
   heating the recess to bend the recess into a curve connection part, whereby the first straight part and the second straight part are permanently not arranged on a same plane; and forming a strengthened layer on the first lateral side after the curve connection part is formed, the strengthened layer being filled into the recess, the strengthened layer comprising a phenyl polymer or epoxy resin, the phenyl polymer having a monomer carbon chain length of C6 to C18; wherein a width of the curve connection part is smaller than a width of the recess, the width of the recess ranges from 30 mm to 70 mm, and the width of the curve connection part ranges from 20 mm to 60 mm.

8. The method of claim 7, wherein the glass substrate comprises a bottom glass, a first adhering glass, and a second adhering glass; the first adhering glass and a second adhering glass are disposed on two opposite sides of the bottom glass; the curve connection part is disposed on the bottom glass; the recess is formed of an enclosure of the bottom glass, the first adhering glass, and the second adhering glass.

9. The method of claim 7, wherein the recess comprises a recess bottom, and a depth from the recess bottom to the second lateral side ranges from 0.03 mm to 0.6 mm; the first straight part comprises a first connection section corresponding to the recess and connected to one end of the curve connection part; the second straight part comprises a second connection section corresponding to the recess and connected to another end of the curve connection part.

10. The method of claim 9, wherein a radius of curvature of the curve connection part ranges from 10 mm to 300 mm; a depth from the first lateral side to the second lateral side ranges from 1 mm to 4 mm; the depth from the recess bottom to the second lateral side ranges from 0.05 mm to 0.4 mm.

11. The method of claim 10, wherein after the recess is formed, the glass substrate undergoes a chemical strengthening process; the recess is formed in an arc or rectangular shape.

12. The method of claim 10, wherein the glass substrate comprises a bottom glass, a first adhering glass, and a second adhering glass; the first adhering glass and a second adhering glass are disposed on two opposite sides of the bottom glass; the curve connection part is disposed on the bottom glass; the recess is formed of an enclosure of the bottom glass, the first adhering glass, and the second adhering glass.

* * * * *